April 18, 1961 C. F. SULLIVAN 2,980,306
HIGH SPEED MOTION PICTURE CAMERA
Filed June 23, 1958 3 Sheets-Sheet 1

INVENTOR.
CHARLES F. SULLIVAN
BY
Darby & Darby
ATTORNEYS

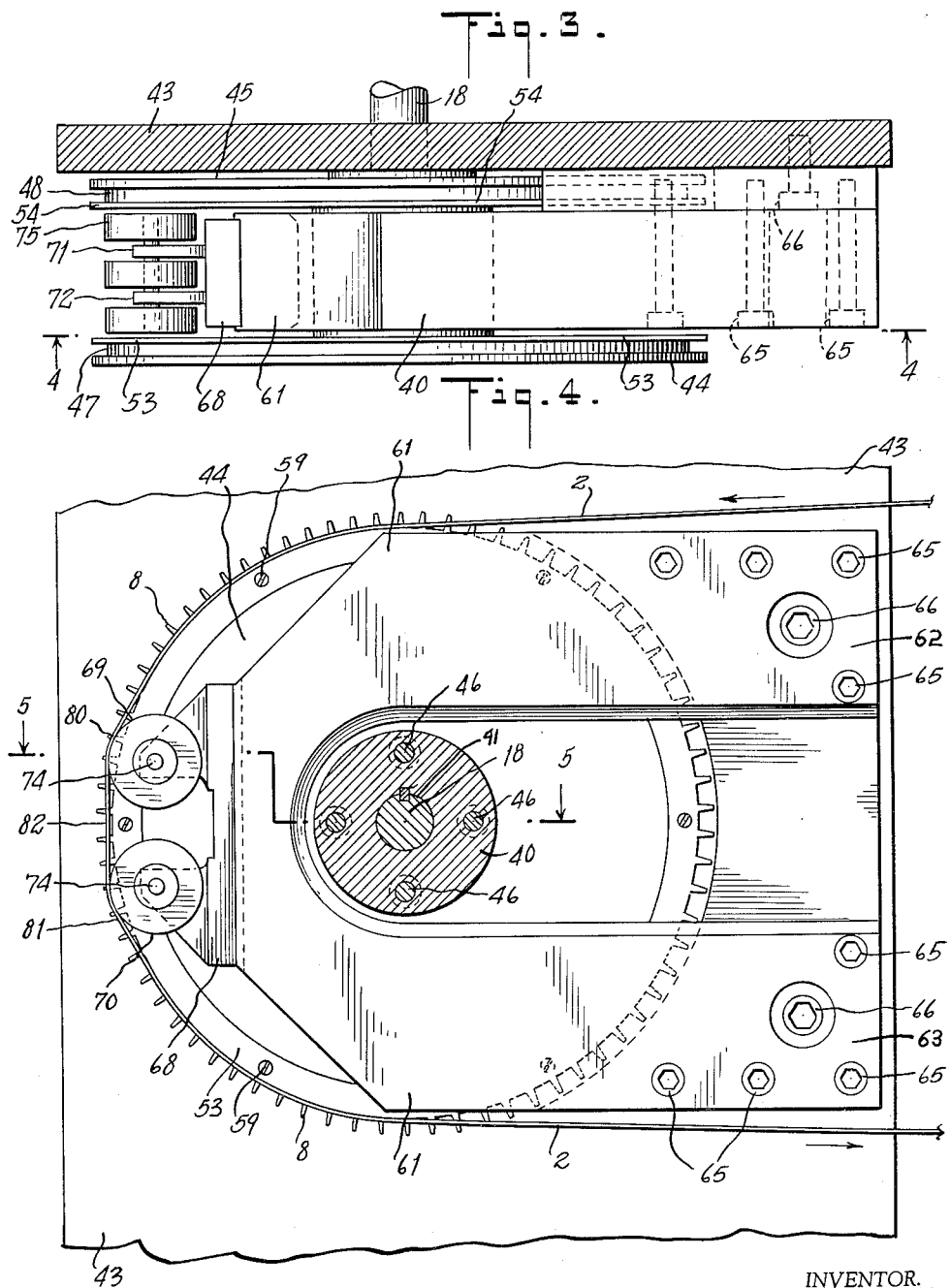

April 18, 1961     C. F. SULLIVAN     2,980,306

HIGH SPEED MOTION PICTURE CAMERA

Filed June 23, 1958     3 Sheets-Sheet 3

INVENTOR.
CHARLES F. SULLIVAN
BY
Darby & Darby
ATTORNEYS 2,980,306
HIGH SPEED MOTION PICTURE CAMERA

Charles F. Sullivan, Bronx, N.Y., assignor to Fairchild Data Devices Corporation, Yonkers, N.Y., a corporation of New York Filed June 23, 1958, Ser. No. 743,929

8 Claims. (Cl. 226—86)

This invention relates to a high speed motion picture camera and more particularly to a high speed camera which is substantially free from jitter and in which good optical resolution of the object photographed is provided.

The present invention permits a high speed camera to utilize film speeds of from 500 to 3,000 frames per second of 35 mm. film, corresponding to linear film speeds of approximately 25 to 150 feet per second. Cameras having such high speeds are useful in the photographing of objects moving at high velocities, for example, in the range of velocities up to twice the speed of sound. Illustrative of the objects which may be photographed with such a camera are rocket sleds, supersonic aircraft, the ejection of pilots from such supersonic aircraft, missiles, and the effects of sudden accelerations and decelerations.

At such high film speeds the design of an adequate film drive mechanism for the camera becomes a serious problem. An intermittent-type film drive, usually a claw-type mechanism, which pulls the film past a film gate, is not practical at these speeds since the sprocket holes of the film are torn by the mechanism. It has therefore become conventional in high speed cameras to use a continuous-motion film transport system. Such a camera, in addition to the film transport mechanism comprises a film gate aperture opposite which the film is driven, a rotating prism which moves the image of the object to be photographed in the same direction and at the same rate of speed as the continuously moving film, and a rotating shutter. The combined action of the rotating prism and continuously moving film, causes the frame of film being exposed at the film gate aperture to remain stationary relative to the image during the period of exposure.

One of the major problems encountered in the design of such a continuous motion film drive system, is that of "jitter." Jitter may be defined as the unwanted translation motion of the film which occurs as the film is being driven by sprocket wheels or a sprocket drum, due to the variation in spacing between the successive sprocket holes of the film, inertia effects and the general vibration of the camera drive mechanism. It will be understood that the hole spacings vary from film to film due to non-uniformity in manufacture and the general aging experienced by the film. Jitter makes the exposed film generally unacceptable for viewing purposes and is therefore a detrimental effect which has to be overcome.

It is well known that jitter increases as the film speed increases since a larger quantity of film is used, with a consequent larger number of frames with possible irregularities in the sprocket hole spacing. Also at higher speeds, the sprocket teeth of the drive sprocket engage the film for a shorter period of time than at lower speeds, which further adds to the instability of the film driving action and thereby increases the jitter.

It has been found that as the diameter of a sprocket drum is increased, and a larger proportionate portion of the drum's periphery is used to engage the film, the jitter decreases. This is due to the fact that a greater degree of stability is imparted to the film since a longer length of film is simultaneously engaged by the sprocket teeth of the sprocket drum. The present invention attains the advantages of such a longer length of engaged film. In one form of the present invention, a suitable drum has been used with a diameter of approximately four and one-half inches. This drum is placed opposite the film gate aperture and the film is made to engage approximately one-half of the surface around the periphery of the drum, or a length equal to about ten frames of 35 mm. film. This provides a stable driving action for the film. The diameter of the sprocket drum cannot be made too large since use of a very large drum would present difficulties in providing a proper drum drive and also would introduce unnecessary vibration into the film drive mechanism and thereby increase jitter. It would also seriously limit the desirable compactness of the camera. Therefore, the choice of the diameter of sprocket drum to be used is actually a compromise between the several factors stated above.

Another expedient useful in reducing jitter resides in making the pitch of the sprocket teeth (i.e., the arcuate distance around the periphery of the drum at the tooth base between the center lines of the individual sprocket teeth) slightly smaller than the distance between the film sprocket holes. This wedges the film sprocket holes onto the sprocket teeth and prevents the film from moving while engaging the drum. Use of a large diameter sprocket drum, with which the film makes contact over a substantial portion of the drum's periphery, and the closely spaced sprocket teeth, has largely eliminated jitter from the present invention.

When a sprocket drum is utilized opposite the film gate aperture to drive the film, a difficulty is encountered in obtaining the required uniform optical resolution, or definition, of the image on the film. This follows from the fact that the curvature of the sprocket drum causes the ends of the film frame opposite the top and bottom of the film gate to be a greater distance from the plane of the film gate than the center of the film frame. This results in the various portions of the film frame being more or less out of focus. Stated another way, the frame of film being exposed does not lie in a single plane parallel to the film gate aperture during the period of exposure, and hence if certain portions are in focus, other portions must necessarily be out of focus.

An attempt has been made to solve the problem of uniform resolution in some cameras by making the film lie in a flat plane opposite the film gate. This is usually accomplished by the use of two small sprocket rollers which are located above and below the film gate aperture so that the film lies in a flat plane for a substantial distance both before and after the film gate. In this arrangement, since the diameters of the sprocket rollers are relatively small, contact is made between the sprocket teeth and the film over only a very short length of the film and the film is not properly supported or driven in the space between the two sprocket drums. Also, small rollers with high film speeds require excessively high rotational speeds for the rollers, introducing further mechanical difficulties. Even where film guides are used, at the high speeds encountered, the film tends to waver toward and away from the gate, introducing other resolution problems. While the resolution in this type of camera is better than that with a sprocket drum, the jitter is still objectionable due to the arrangement of the two small sprocket rollers.

The present invention provides the advantages of both the reduced jitter of the large sprocket drum and the flat field for uniform resolution. In the present invention, the film is driven by a large diameter sprocket drum opposite the film gate and the film is also placed in a single flat plane, substantially parallel to the plane of the film gate, but only in the space directly opposite the film gate aperture. The film is kept continuously in engagement with the sprocket teeth of the sprocket drum over a substantial portion of the drum periphery, including the portion lying in a flat plane opposite the film gate. This is accomplished in a preferred form by rollers located immediately above and below the film gate aperture which serve to place the film in a flat plane between them without disengaging the film from the sprocket drum. Utilizing this arrangement, the problem of jitter is overcome while good optical resolution is also maintained, since the film is engaged by the sprocket teeth over a substantial portion of the sprocket drum's periphery and the film is presented in a flat plane opposite the film gate aperture.

It is therefore an object of this invention to provide a high speed motion picture camera with a novel and improved film drive.

It is a further object of this invention to provide a high speed camera in which the film is substantially free from jitter and in which the required degree of uniform optical resolution is simultaneously maintained.

Yet another object of this invention is to provide a film drive mechanism for a high speed camera which utilizes a large diameter sprocket drum with which the film makes contact over a substantial portion of the drum's periphery, in order to prevent jitter, while maintaining substantially uniform resolution over the entire area of each frame.

Another object of this invention is to provide a film drive mechanism for a high speed camera in which the film engages sprocket teeth located around the periphery of the sprocket drum over a substantial portion of the periphery of the drum and in which the film opposite the film gate lies in a plane substantially parallel to that of the film gate, while still engaging the sprocket teeth on the drum.

Other objects and advantages of this invention will become more apparent upon consideration of the following specification and annexed drawings in which, Fig. 1 shows a partial section side elevation view of a camera and housing according to the invention;

Fig. 3 shows a top plan view of the sprocket drum and roller assembly taken along line 3—3 of Figure 1;

Fig. 4 shows a partial section, side elevation view of the sprocket drum and the roller assembly taken along line 4—4 of Fig. 3;

Figure 1:
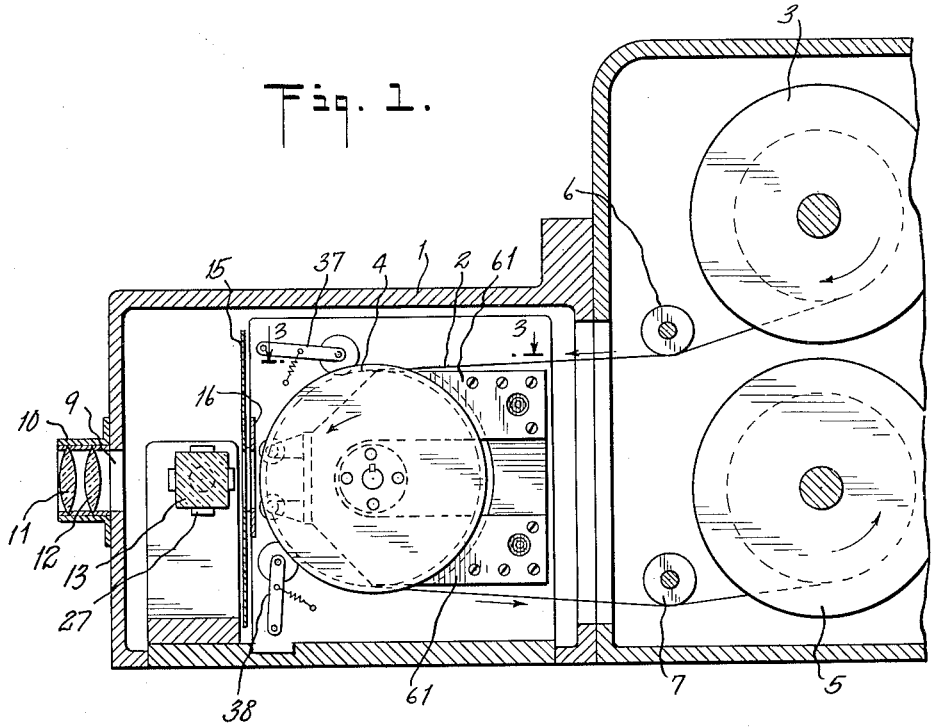

In accordance with the objects of this invention, the best aspects of the large diameter sprocket drum and of the flat film arrangement are used to simultaneously solve the problems of jitter and proper optical resolution. The jitter is overcome by providing a large diameter drum on which the film engages sprocket teeth disposed around a major portion of the periphery of the drum for approximately half the circumference of the drum. This provides a positive driving action for the film at high speeds and the jitter, due to changes in tension of the film or sprocket hole size or general vibration of the drive mechanism, is minimized because of the large area of engagement between the sprocket drum and the film.

To obtain the proper uniform optical resolution, without introducing any jitter into the system, the film on the drum opposite the film gate is placed in a flat plane substantially parallel to the plane of the film gate while still maintaining contact with the sprocket teeth on the drum. This is accomplished by providing upper and lower roller sets located just before and after the film passes the film gate. The upper roller set, located before the film passes the film gate, causes the film to ride up from the roots of the drum sprocket teeth to the tips of the teeth. The film then passes over the upper roller set to the lower roller set, located after the film gate, and due to the positioning and diameter of the rollers, still maintains contact with the sprocket teeth of the sprocket drum between the two roller sets. Therefore, the film in the space between the two roller sets is substantially flat and at the point opposite the center of the film gate, the film is preferably tangential to the drum itself and therefore is supported by the rollers and drum at three places in a single plane parallel to the plane of the film gate. After passing over the lower roller set the film once again rides down onto the bases of the sprocket teeth. Utilizing such an arrangement, the jitter is markedly reduced and to a practical extent eliminated without detracting from the optical resolution.

Referring to the drawings, the high speed camera is shown generally located within a main, light-tight camera housing 1. The unexposed film 2 is fed from a supply reel 3 located in the rear compartment of the housing 1 to a sprocket drum 4, having a number of sprocket teeth 8 spaced around its periphery. The sprocket teeth 8 are used to engage the sprocket holes (not shown) of the film 2 to drive the film, as is well known and preferably have the same pitch as the film sprocket holes. A takeup reel 5 is also located in the rear compartment of the housing 1 and serves to reel up the film 2 after exposure while keeping the film 2 in engagement with the bottom portion of drum 4. The direction of travel of the film 2 and the direction of rotation of the supply reel 3 and the takeup reel 5 are shown by the various arrows. The supply reel 3 may have a frictional retarding mechanism to avoid slack between it and the drum 4. The takeup reel 5 is individually driven by a suitable driving means, such as a motor (not shown) which exerts a continuous tension on the film between drum 4 and the reel 5. For a smooth feed and takeup operation, idler rollers 6 and 7 are located adjacent the supply reel 3 and the takeup reel 5.

The front of the housing 1 has a circular aperture 9 around which is attached a lens holder 10 by suitable mounting means. As illustratively shown, the lens holder 10 houses two double convex lenses 11 and 12 which are used to focus light rays from the object being photographed (not shown) onto the film 2. As is well known, the lens holder 10 may be detachably mounted thereby providing for rapid changing of the lenses to suit a particular purpose and any suitable type of lens may be used. An iris diaphragm may also be provided at the aperture 9 to determine the amount of light admitted into the housing 1 if desired.

Also located within the housing 1, between the aperture 9 and the film 2, are a rotating rectangular prism 13, a rotating shutter 15 and a film gate aperture plate 16. The sprocket drum 4, rotating rectangular prism 13, and rotating shutter 15 are commonly driven by a single, preferably constant speed, source such as a stable synchronous motor (not shown). The drum 4 is here illustratively shown as being driven by a drum drive spur gear 17 suitably coupled to the drive motor (not shown) by means of a shaft 18.

Meshing with the drum drive gear 17 is a smaller spur gear 19 which is used to drive the prism 13 and the shutter 15. A shaft 20 having one end fixed to the drive gear 19 is rotatably mounted in a bearing 21. Fixed to the other end of the shaft 20 is a first bevelled gear 22 which meshes with a second bevelled gear 23. The second bevelled gear 23 is suitably connected to the center of the shutter 15 and drives the shutter 15 in synchronism with the rotating prism 13.

A coupling 25 has one end connected to the first bevelled drive gear 22, and is mounted in a second bearing 26. A frame bracket 27 is connected to the opposite end of the coupling 25 of the bevelled gear 22 and one end of prism 13 is suitably mounted within the bracket 27. The other end of prism 13 is mounted in a second bracket 28 connected to an extension 30 of the coupling 25, which is mounted in a third bearing 31. Therefore it is seen that the prism 13 is imparted rotary motion by means of the drive gear 19, the shaft 20, and the two brackets 27 and 28 attached to couplings 25 and 30.

The shutter 15 is rotated continuously by means of the second bevelled gear 23 which meshes with the first bevelled gear 22 attached to the shaft 20. As illustratively shown, the shutter 15 has four trapezoidal shaped apertures 32, 33, 34 and 35 spaced equi-angularly around the shutter 15 (here every 90°). In the present invention, the film 2 is preferably exposed only during 1/10 of the period that it appears in the film gate 16. This is accomplished by maintaining a proper relationship between the speeds of rotation of rectangular prism 13 and the size and speed of rotation of trapezoidal apertures 32, 33, 34 and 35 of the shutter 15, as described below.

Figure 2:
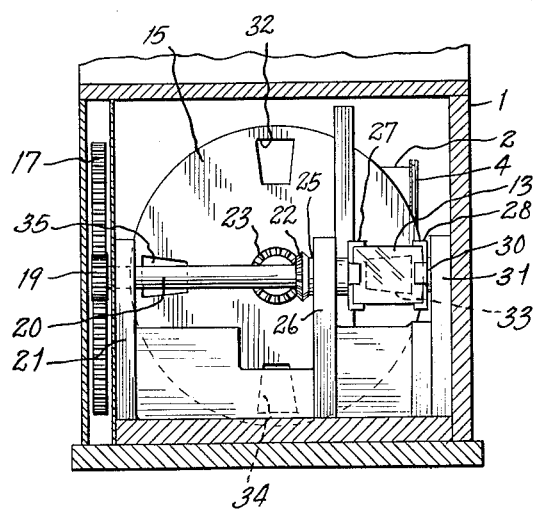
Fig. 2 shows a partial section, front elevation view of the camera and housing of Fig. 1.

The gearing arrangement between the prism 13 and shutter 15, in one illustrative embodiment, is such that the leading edge (bottom edge) of each shutter aperture, such as 33, passes the top of the film gate aperture 16 when the prism 13 is tilted up at an angle of 4½° from its center position, shown in Figures 1 and 2. When the shutter aperture 33 completely opens the film gate 16 the rotating rectangular prism 13 is in its center position. The trailing (top) edge of the aperture 33 passes the bottom edge of the film gate 16 when prism 13 is tilted 4½° down from its center position. In this manner, only 9° of the prism rotation is used to expose each frame of the film 2. Since the focussed image must remain stationary with respect to the film during the exposure, the prism speed is synchronized to the film speed in the proper ratio to accomplish this. The rigid geared coupling between prism, drum and shutter assures maintaining this synchronism. The operation of the other shutter apertures 32, 34 and 35 with respect to the prism 13 is identical.

Each of the apertures 32, 33, 34 and 35 of the shutter 15 is thus of an angular sector width of 9°, or a total of 36° of the circular shutter 15. This means that the film 2 is exposed only during 1/10 of the total 360° rotation of the shutter 15. The shutter 15 is rotated at a speed to expose every frame of the film 2. Thus, each frame is exposed in the time interval taken for the shutter to move 9°. In this interval, the film has moved only slightly; thus, the film moves one frame in the time taken for the shutter to rotate 90°. It should be realized that other arrangements may be used wherein the exposure time of the film 2 is equal to, greater or less than 1/10 of the total time the film is in the film gate 16. This can be accomplished by using a prism 13 with a different number of faces or by having a different number of apertures of different angular sector widths on shutter 15, or both.

As previously stated, the problem of jitter is overcome by making the sprocket drum 4 of a large diameter, and engaging the film 2 with the drum 4 over a large portion of the periphery of the drum 4. This insures a positive driving action of the film 2 by the drum 4. As shown in Fig. 1, the film 2 engages the sprocket teeth 8, spaced around the periphery of the sprocket drum 4, for approximately half of the periphery of the sprocket drum 4. This is accomplished by the proper positioning of idler roller 6, idler roller 7, supply reel 3 and the takeup reel 5 with respect to the drum 4. To insure that the film is placed firmly over the sprocket teeth 8 spring biased rollers 37 and 38 are provided to press the film 2 onto the sprocket teeth 8. In a preferred embodiment of the invention, the sprocket drum 4 is of a diameter of approximately 4½" and engages about ten frames of 35 mm. film over half its periphery.

Figure 5:
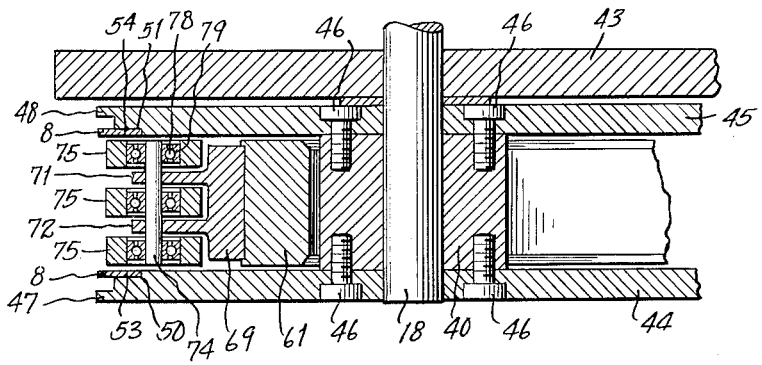
Fig. 5 shows a top sectional view of a portion of the sprocket drum and the roller assembly taken along line 5—5 of Fig. 4.

Figs. 3, 4 and 5 show more detailed views of the sprocket drum 4 arrangement of the present invention. The sprocket drum 4 is preferably hollow, formed with a center hub portion 40, cut out with a keyway slot 41, which receives the end of the keyed shaft 18, which connects the sprocket drum 4 to the sprocket drum drive gear 17. The shaft 18 extends through an inner housing wall 43 located within the main housing 1. Rims 44 and 45 are attached to each side of the hub 42 by any suitable means such as screws 46. Rims 44 and 45 have side shoulders 47 and 48, respectively, to provide a channel therebetween for the film 2 to ride in. This prevents any lateral motion of the film 2.

Rims 44 and 45 are also undercut at 50 and 51 around their inner surfaces. The undercut portions 50 and 51 of the rims 44 and 45 receive sprocket tooth rings 53 and 54, which are formed with the sprocket teeth 8 around their peripheries in general involute form. The rings 53 and 54 are fastened to the rims 44 and 45 by any suitable means, such as screws 59.

The reel shaped sprocket drum 4 allows a roller assembly to be placed around the hub 40. The roller assembly performs the function of lifting the film 2 from the roots of the sprocket teeth 8 to near the tips of the teeth at a point immediately above the film gate and the function of returning the film 2 to the roots of the sprocket teeth 8 at a point immediately below the film gate 16, so that the film 2 lies in a flat plane directly opposite the film gate 16 to insure good uniformity of optical resolution.

The roller assembly is illustratively shown as comprising a rigid horseshoe shaped roller holder 61 having top and bottom arms 62 and 63. The open end of the holder 61 is placed around and spaced from the center hub portion 40 of the sprocket drum 4 and the top and bottom arms 62 and 63 are fastened to the housing wall 43 by any suitable means, such as bolts 65 and 66. The holes through the top and bottom arms 62 and 63 through which bolts 65 and 66 pass, are over-sized or slotted and permit a degree of adjustment of the roller holder 61.

A roller bearing support 68 is fastened by any suitable means to the closed end of the horseshoe roller holder 61. The roller bearing support 68 has respective upper and lower sections to accommodate respective upper and lower roller sets 69 and 70. The upper roller set 69 is located opposite a point slightly above the upper edge of the film gate 16 while the lower roller set 70 is located opposite a point slightly below the bottom edge of the film gate aperture 16. Between the two roller sets 69 and 70, the film 2 lies in a single flat plane which is parallel to the plane of the film gate aperture 16, with the film 2 still being in contact with the tips of the sprocket teeth 8 and preferably tangential to the rim 44, 45 at the gate center.

Each of the upper and lower sections of roller bearing support 68 is bifurcated with arms 71 and 72 and each of the arms 71 and 72 has a bore at its center portion to receive a shaft 74, which is fixedly mounted between arms 71 and 72. The shafts 74 of the upper and lower roller sets 69 and 70 lie in a single plane which is parallel to the plane of the film gate 16. Mounted on each of the shafts 74 are three rollers 75 of similar construction and diameter. The rollers 75 rotate about the shaft 74 by means of roller ball bearings 78 in a well known manner when engaged by the film 2. By using three rollers 75, both the edges and the center of the film 2 are simultaneously engaged by the rollers 75 and there is a minimum amount of friction between the film and the rollers 75. The rollers 75 are made of any suitable material, for example, a suitable metal, or synthetic material such as nylon, Teflon, etc. While three rollers 75 are illustratively shown mounted on each of the shafts 74, it should be understood that any other number of rollers 75 may be used.

As seen in Figs. 3, 4 and 5, the rollers 75, extend slightly beyond the roots of the sprocket teeth 8 on the sprocket teeth rings 53 and 54. Therefore, when the rollers 75 of the upper roller set 69 engage the film 2 they lift the film 2 off the roots of the sprocket teeth 8 and move it towards the tips of the sprocket teeth. To avoid possible buckling of the film 2 in the spaces between the center and the outside rollers, the arms 71 and 72 may be extended to the flush with rollers 75, to slidably engage the film 2 at points lying in the same plane determined by the rollers 75. The rollers 75 lift the film 2 off the sprocket teeth 8 just enough so that the portion of the film between the two roller sets is kept in a flat plane; desirably the center of the flat film section just touches the drum rims 44, 45 so as to keep a further point of support for the film at the center of the gate. The roller wheels 75 of the lower roller set 70 allows the replacement of the film 2 back onto the roots of the sprocket teeth 8 at a point after the bottom edge of the film gate 16.

It will be recognized that the length of film shown in Fig. 4 is slightly greater than the length would be if the rollers 75 were omitted. The film is negligibly stretchable, so provision is made to permit this slightly greater length. In standard film, the sprocket holes have a longitudinal dimension of 73 mils, which would be the normal sprocket tooth root width. In the present invention, the sprocket tooth root width is reduced slightly. Illustratively, the width of the roots of the sprocket teeth 8 is selected as 70 mils for the average width of 73 mils for the sprocket holes on the film 2. The 3 mil difference has been found sufficient to accommodate the removing and replacing of the film from roots of the sprocket teeth 8 by the rollers 75. Desirable results are also obtained for tooth widths down to 55 mils.

The operation of the camera is as follows: The film 2 is fed from the supply reel 3 and passes under roller 6 and comes into engagement with the sprocket teeth 8 of the continuously driven sprocket drum 4 at a point just prior to contact with spring biased roller 37 which presses the film down on the sprocket teeth. As previously stated, the sprocket drum 4 is continuously driven by a suitable driving source (not shown) and is the sole source of transport for the film. As the film 2 moves past roller 37 it comes into contact with rollers 75 of upper roller set 69. Since the rollers 75 extend slightly beyond the roots of the sprocket teeth 8, the film 2 is lifted from the roots of the sprocket teeth 8 and rides upward towards the tips of the teeth 8. This is most clearly shown in Fig. 4, where it is seen that the film 2 is lifted from the roots to near the tip of the sprocket teeth 8, at the point 80. In this position, the teeth may still remain in engagement with the film, at one edge of the sprocket holes. The film 2 returns to substantially the normal position on the sprocket drum 4 opposite the center of the gate 16, so that full and positive drive exists at this point between the sprocket teeth and the walls of the film sprocket holes. At the point 82, which is essentially mid-way between the upper and lower roller sets 69 and 70, the film 2 is substantially tangential to the periphery of the sprocket drum 4. The rollers 75 of the lower roller set 70 again lift the film 2 up on the tips of the teeth. At point 81 the film 2 begins to ride off the tips of the sprocket teeth 8 and returns to engagement with the roots of the sprocket teeth 8 and continues in such engagement further along the periphery of the sprocket drum 4. Therefore it can be seen that in the space between the upper and lower roller sets 69 and 70 the film 2 lies in a flat plane which is substantially parallel to the plane of the film gate 16. In this space, the walls of certain of the sprocket holes of the film 2 still maintain contact with certain of the sprocket teeth 8.

Thus the flat film section opposite the film gate aperture is obtained, as required for uniform resolution over the frame area, while the film itself remains in substantial contact with a major portion of the periphery of the drum 4. In particular, the sprocket teeth remain in engagement with and proper position relative to the sprocket holes so that no jitter is imparted by having the teeth pick up and renew engagement with the holes, as in prior arrangements utilizing flat film sections.

Figure 6:
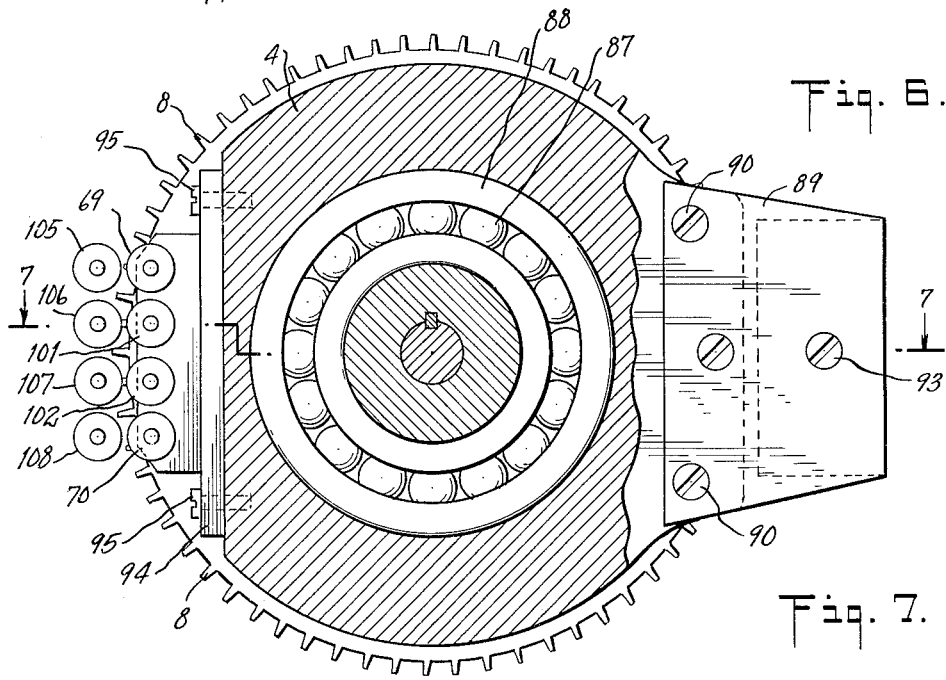
Fig. 6 shows a partial broken away, side elevation sectional view of another form of sprocket drum and roller assembly.
Figure 7:
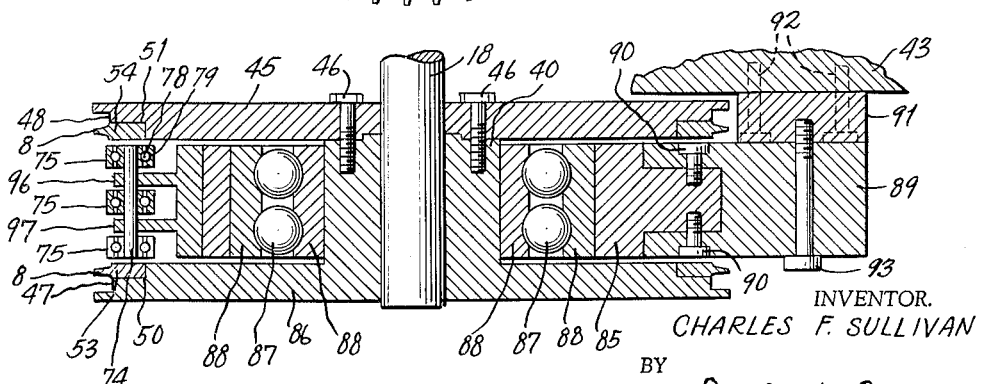
Fig. 7 shows a top sectional view of the sprocket drum and roller assembly taken along line 7—7 of Fig. 6.

Figs. 6 and 7 show another embodiment of the invention which may be utilized to produce a high speed camera having similar advantages. In this embodiment, a roller holder 85 is utilized which is directly mounted on the center hub 40 of the reel shaped sprocket drum 4, as by a suitable bearing 87 allowing the drum to rotate freely. The center hub portion 40, in the embodiment of Fig. 7, is formed on one side integrally with the rim 86 allowing roller holder 85 to be slipped over the open side. To the open side of the center hub 40 is attached the second rim 45 by any suitable fastening means, such as screws 46, in the same manner as shown in Fig. 5. The sprocket drum 4 of this embodiment also has sprocket rings 53 and 54, having sprocket teeth 8 mounted around their peripheries, located in the undercut portions 50 and 51 of the rims 86 and 45.

At one end of the roller holder 85 a plurality of roller sets, 69, 70, 101 and 102, similar to the upper and lower roller sets 69 and 70 of Figs. 3 and 4, are provided. A bracket 89 is fastened to the other end of the roller holder 85 by suitable means, such as screws 90. The bracket 90 is mounted on a spacer block 91 by screws 93 by means of which the angular position of the roller holder 85 may be adjusted. The spacer block 91 is in turn fastened to the inner housing wall 43 by any suitable means such as screws 92.

A roller bearing support 94 is fastened to the end of the roller holder 85, opposite the bracket 89, by any suitable means, such as screws 95. Shim stock may be provided between the roller bearing support 74 and the roller holder 85 to allow for a fine setting of the roller set position. The roller bearing support 94 is formed with two arms 96 and 97 and located between the arms 96 and 97 are four shafts 74. The shafts 74 lie in a single plane which is parallel to the plane of the film gate 16. Three rollers 75 are mounted on each of the shafts 74 to form roller sets 69, 70, 101 and 102. The top and bottom roller sets 69 and 70 are located opposite the top and bottom of the film gate aperture as in Fig. 1 and perform the same function as previously described. The additional roller sets 101 and 102 provide extra support to keep the film 2 in a flat plane opposite the aperture gate 16.

Mounted opposite each of the four sets of rollers, 69, 70, 101 and 102, by any suitable means (not shown) are four more sets of rollers 105, 106, 107 and 108. From each of the outside sets of rollers 105, 106, 107 and 108, the center section is removed to allow a clear path between the gate and the film. This can be accomplished by suitably mounting the rollers 75 as by means of an outside bracket. The outside sets of rollers 105, 106, 107 and 108 keep the film flat between the roller sets and also prevent "breathing" which is an undesirable fluctuation of the film along the lens axis.

The operation of the invention in the embodiment of Figs. 6 and 7 is similar to that previously described. As the film passes over the top of the sprocket drum 4 it is lifted from the roots of the sprocket teeth 8 at a point just prior to the uppermost roller set 69. The film 2 then passes in a flat plane between the eight roller sets mounted opposite each other while still making contact with the teeth 8 of the sprocket drum 4. The sprocket holes of the film 2 are pressed back into contact with the roots of sprocket teeth 8 of the sprocket drum 4, after passing over the bottom roller set 70, by means of the roller 38 and the tension placed on the film by the pickup reel 5.

It should be recognized, that the roller holder 85 of Figs. 6 and 7 may be used in the embodiments of the invention shown in Figs. 1 to 5 with only two of the roller sets 69 and 70 being utilized, as shown in Fig. 4, rather than the eight sets shown in Fig. 6. Also, the horseshoe shaped roller holder 61 of Fig. 4 could also be modified to accommodate the eight roller sets shown in the embodiments of Fig. 6.

Therefore it is seen that the present invention provides a film drive apparatus for a high speed camera, which simultaneously solves the problems of jitter at high speeds and uniform resolution.

While only several embodiments of the invention have been shown, it is obvious that the invention need not be limited to those illustrated, but may be used whenever stable, uniform film transport is desired, with a flat section. The present invention is not concerned with the various elements which are old in the art, such as the rotating prism, shutter, or film gate, nor is it limited to any particular speed or exposure time of the film, or any particular relationship between the rotating prism and shutter. The particular details of construction illustrated are also subject to many modifications obvious to those skilled in the art without departing from the spirit and scope of the invention, which is to be limited only by the claims set forth below.

What is claimed is:

1. A high speed camera for a continuously driven film having sprocket holes along its length, comprising a film gate having an aperture, a sprocket drum disposed opposite said film gate aperture and having sprocket teeth around its periphery adapted to engage the walls of said sprocket holes, and means engaging said film to place it in a single plane opposite said film gate aperture while still maintaining contact between certain of the sprocket teeth and the walls of certain of the sprocket holes of the film lying in said plane.

2. A high speed camera for a continuously driven film having sprocket holes along its length, comprising: a film gate having an aperture, a sprocket drum disposed opposite said film gate aperture and having sprocket teeth around its periphery adapted to engage the walls of said sprocket holes, means including a plurality of roller means placed above and below said film gate aperture for placing said film in a single plane between said roller means while still maintaining contact between certain of the sprocket teeth and the walls of certain of the sprocket holes of the film between said roller means.

3. A high speed camera for a film having sprocket holes along its length, comprising: a film gate having an aperture, a reel-shaped sprocket drum having a center hub and two rims, said drum being opposite said film gate aperture and having sprocket teeth disposed around the peripheries of said rims to engage said film at said film sprocket holes, a roller holder mounted around said center hub, a plurality of roller means on said roller holder for engaging said film to place the portion of it opposite said film gate aperture in a single plane while still maintaining substantial contact between certain of the sprocket teeth and the walls of certain of the sprocket holes of the film lying in said plane.

4. A high speed camera for a film having sprocket holes along its length comprising: a film gate having an aperture, a reel-shaped sprocket drum having a center hub, and two rims, said drum being opposite said film gate aperture and having sprocket teeth disposed around the peripheries of said rims to engage said film at said sprocket holes, a U-shaped roller holder disposed around said center hub, and upper and lower roller means mounted on the closed end of said roller holder above and below the top and bottom edges of said film gate aperture, both said roller means having their peripheries extending beyond the root circles of said sprocket teeth by an amount less than the height of said teeth, whereby said upper roller means is adapted to lift the sprocket holes from the roots of said sprocket teeth to near the tips of said sprocket teeth, and said lower roller means is adapted to permit all of the film sprocket holes to return to the roots of said sprocket teeth beyond said lower roller means with said film lying in a flat plane between said upper and lower roller means and with certain of said sprocket teeth engaging the walls of certain of said sprocket holes in the space between said upper and lower roller means.

5. A high speed camera as in claim 4 where each of said roller means comprises a plurality of rollers which engage the edges and central portions of said film.

6. A high speed camera for a film having sprocket holes along its length comprising: a film gate having an aperture, a reel-shaped sprocket drum having a center hub and two rims, said drum being opposite said film gate aperture and having sprocket teeth disposed around the peripheries of said rims to engage said film at said film sprocket holes, a roller holder mounted around said center hub, first roller means on said roller holder for engaging said film to place the portion of it opposite said film gate aperture in a single plane while still maintaining substantial contact between certain of the sprocket teeth and the walls of certain of the sprocket holes of the film lying in said plane, and second roller means located opposite said first roller means, said film being adapted to pass between said first and said second roller means.

7. A sprocket drum assembly as in claim 6 where said first roller means comprises a plurality of rollers adapted to engage the edges and center portions of said film.

8. A sprocket drum assembly as set forth in claim 3 wherein each of said roller means comprises a plurality of rollers adapted to engage the edges and center portions of said film.

References Cited in the file of this patent

UNITED STATES PATENTS

| 2,153,214 | Tondreau | Apr. 4, 1939 |
| 2,508,789 | Harrison | May 23, 1950 |
| 2,831,391 | Culver | Apr. 22, 1958 |

FOREIGN PATENTS

| 708,112 | France | Apr. 27, 1931 |
| 376,787 | Great Britain | July 15, 1932 |
| 620,580 | Great Britain | Mar. 28, 1949 |
| 674,964 | Great Britain | July 2, 1952 |